US012756463B2

(12) United States Patent
Hori et al.

(10) Patent No.: US 12,756,463 B2
(45) Date of Patent: Oct. 6, 2026

(54) OPTICAL WIRELESS TRANSMISSION SYSTEM, TRANSMISSION DEVICE, AND OPTICAL WIRELESS TRANSMISSION METHOD

(71) Applicant: NEC Corporation, Tokyo (JP)

(72) Inventors: Shinichi Hori, Tokyo (JP); Yuma Kase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 242 days.

(21) Appl. No.: 18/833,470

(22) PCT Filed: Feb. 1, 2022

(86) PCT No.: PCT/JP2022/003846
§ 371 (c)(1),
(2) Date: Jul. 26, 2024

(87) PCT Pub. No.: WO2023/148822
PCT Pub. Date: Aug. 10, 2023

(65) Prior Publication Data
US 2025/0112696 A1 Apr. 3, 2025

(51) Int. Cl.
*H04B 10/11* (2013.01)
*H04B 10/524* (2013.01)

(52) U.S. Cl.
CPC ........... *H04B 10/11* (2013.01); *H04B 10/524* (2013.01)

(58) Field of Classification Search
None
See application file for complete search history.

(56) References Cited

FOREIGN PATENT DOCUMENTS

| | | | | |
|---|---|---|---|---|
| JP | H02-260725 | A | | 10/1990 |
| JP | 2004-040242 | A | | 2/2004 |
| JP | 2005-79855 | A | | 3/2005 |
| JP | 2013-081106 | A | | 5/2013 |
| JP | 2018133716 | A | * | 8/2018 |

OTHER PUBLICATIONS

International Search Report for PCT Application No. PCT/JP2022/003846, mailed on Apr. 19, 2022.

Cordeiro, Rui F. et al., All-Digital Transmitter with RoF Remote Radio Head, 2014 IEEE MTT-S International Microwave Symposium (IMS2014), Jul. 10, 2014, Retrieved from the Internet: < URL:https://ieeexplore. ieee.org/stamp/stamp.jsp?tp=&arnumber=6848470>, <DOI:10.1109/MWSYM.2014.6848470>.

* cited by examiner

*Primary Examiner* — David W Lambert
(74) *Attorney, Agent, or Firm* — Sughrue Mion, PLLC

(57) ABSTRACT

An optical wireless transmission system includes a transmission device including a digital baseband processor configured to generate a plurality of orthogonal signals, a pulse modulator configured to pulse-modulate an orthogonal signal, and a dither modulator configured to add a dither signal to a pulse-modulated signal, an optical fiber module configured to convert a signal to which a dither signal is added into an optical signal, transmit the optical signal through an optical fiber, and convert the optical signal into a digital electric signal, and a remote unit configured to transmit a digital electric signal transmitted by the optical fiber module as a radio signal.

7 Claims, 11 Drawing Sheets

OPTICAL WIRELESS TRANSMISSION SYSTEM, TRANSMISSION DEVICE, AND OPTICAL WIRELESS TRANSMISSION METHOD

This application is a National Stage Entry of PCT/JP2022/003846 filed on Feb. 1, 2022, the contents of all of which are incorporated herein by reference, in their entirety.

TECHNICAL FIELD

The present disclosure relates to an optical wireless transmission system, a transmission device, and an optical wireless transmission method.

BACKGROUND ART

As one of optical wireless transmission systems, there is an optical fiber wireless transmission system in which a high-frequency radio signal generated by a transmission device is directly transmitted to a remote unit through an optical fiber. In this optical fiber wireless transmission system, there is no need to equip the remote unit with a digital to analog converter (DAC), so that the following can be expected: the cost for the remote unit may be reduced; the efficiency of the system may be improved; and the remote unit may be installed more easily. For example, Patent Literature 1 describes a transmission system in which a wireless control station up-converts a signal into a radio frequency band, converts the signal into a light intensity modulation signal, and transmits the signal, and a radio base station converts the light intensity modulation signal into an electric signal and combines the signals.

On the other hand, in order to use an optical component (optical module) for general-purpose digital communication in order to reduce the cost, the transmission waveform is required to be rectangular and not to have an extremely large or small mark rate (80% or more, 20% or less, or the like).

In a general pulse-modulated signal that modulates a radio signal into a rectangular wave, amplitude is expressed by a pulse width, and thus when the amplitude of the radio signal decreases, a mark rate decreases. Note that the mark rate is a ratio of time occupied by "high" within a certain time.

On the other hand, since the amplitude of a radio signal used for recent mobile communication such as orthogonal frequency division multiplexing (OFDM) dynamically and greatly changes, a moment point at which the mark rate becomes extremely small occurs.

Since the mark rate of a modulated signal such as OFDM exceeds the range of the mark rate of the optical module for general-purpose digital communication, the optical module for general-purpose digital communication cannot be used for current mobile signals. Therefore, in an optical wireless transmission system using a modulated signal such as OFDM, it is necessary to use a dedicated optical module. The above technique may result in an increase in cost of the optical module.

CITATION LIST

Patent Literature

Patent Literature 1: Japanese Unexamined Patent Application Publication No. 2005-79855

SUMMARY OF INVENTION

Technical Problem

As described above, there is a problem that it is difficult to use a commercially available optical module for general-purpose digital communication in an optical fiber wireless transmission system in which a high-frequency radio signal is directly transmitted to a remote unit though an optical fiber.

Solution to Problem

An optical wireless transmission system according to an example embodiment includes a transmission device including a digital baseband processor configured to generate a plurality of orthogonal signals, a pulse modulator configured to pulse-modulate an orthogonal signal, and a dither modulator configured to add a dither signal to a pulse-modulated signal, an optical fiber module configured to convert a signal to which a dither signal is added into an optical signal, transmit the optical signal through an optical fiber, and convert the optical signal into a digital electric signal, and a remote unit configured to transmit a digital electric signal transmitted by the optical fiber module as a radio signal.

A transmission device according to an example embodiment includes a digital baseband processor configured to generate a plurality of orthogonal signals, a pulse modulator configured to pulse-modulate an orthogonal signal, and a dither modulator configured to add a dither signal to a pulse-modulated signal.

An optical wireless transmission method according to an example embodiment includes, in a transmission device, generating a plurality of orthogonal signals, pulse-modulating an orthogonal signal, and adding a dither signal to a pulse-modulated signal, in an optical fiber module, converting a signal to which a dither signal is added into an optical signal, transmitting the optical signal through an optical fiber, and converting the optical signal into a digital electric signal, and in a remote unit, transmitting a digital electric signal transmitted by the optical fiber module as a radio signal.

Advantageous Effects of Invention

According to the optical wireless transmission system, the transmission device, and the optical wireless transmission method of the present disclosure, in an optical wireless transmission system in which a high-frequency radio signal is directly transmitted to a remote unit through an optical fiber, stable operation is possible even with a commercially available optical module for general-purpose digital communication.

EXAMPLE EMBODIMENTS

First Example Embodiment

Figure 1:
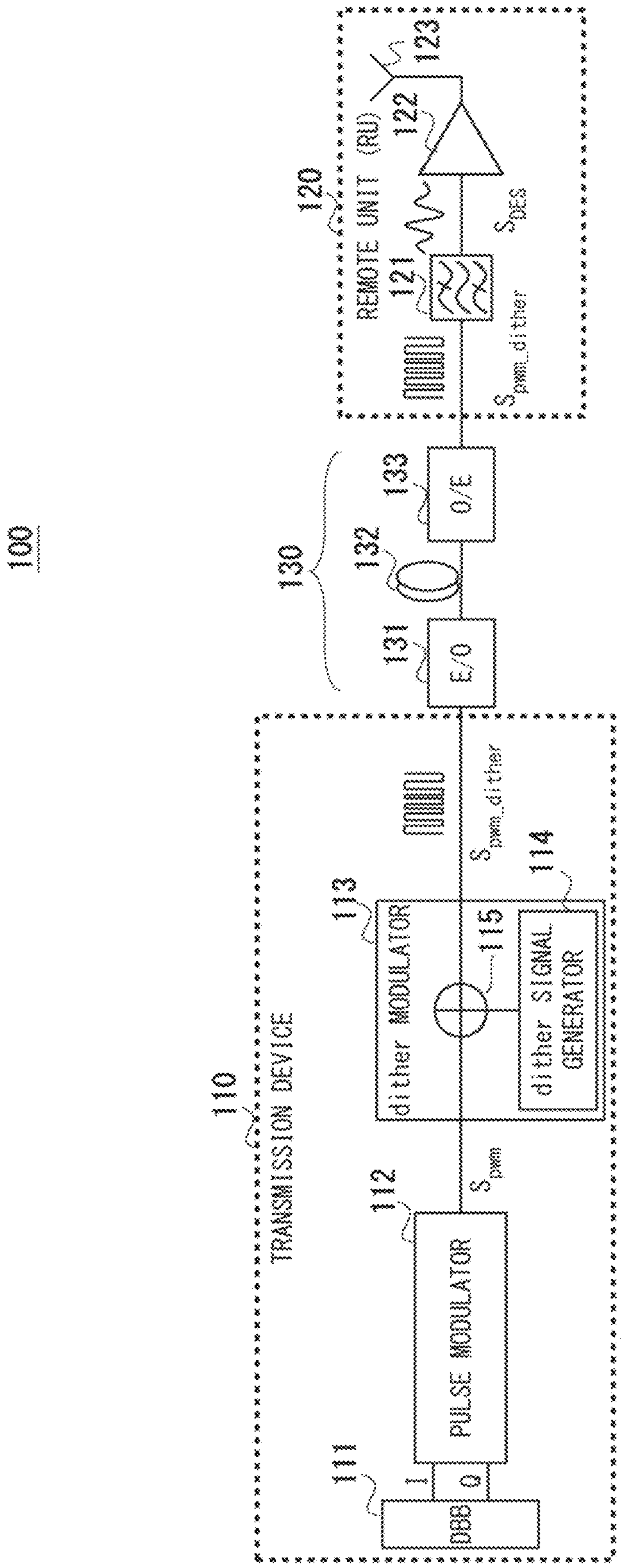
FIG. 1 is a block diagram illustrating an example of an optical wireless transmission system according to a first example embodiment.

Hereinafter, example embodiments of the present disclosure will be described with reference to the drawings. FIG. 1 is a block diagram illustrating an example of an optical wireless transmission system according to a first example embodiment. In FIG. 1, an optical wireless transmission system 100 includes a transmission device 110 and a remote unit 120.

The transmission device 110 includes a digital base band (DBB) 111, a pulse modulator 112, and a dither modulator 113. The dither modulator 113 includes a dither signal generator 114 and an adder 115. The remote unit 120 includes a band path filter (BPF) 121, a power amplifier 122, and an antenna 123. In addition, the transmission device 110 and the remote unit 120 are connected via an E/O 131, an optical fiber cable 132, and an O/E 133. The E/O 131, the optical fiber cable 132, and the O/E 133 constitute an optical fiber module 130.

The DBB 111 generates two radio orthogonal signals I and Q. Then, the radio orthogonal signals are output to the pulse modulator 112.

The pulse modulator 112 performs pulse width modulation on the radio orthogonal signals to generate a pulse radio signal. Then, the pulse modulator 112 outputs the pulse radio signal to the adder 115.

The dither signal generator 114 generates a dither signal. Then, the dither signal generator 114 outputs the dither signal to the adder 115.

The adder 115 adds the dither signal to the pulse radio signal to generate a dither-including pulse radio signal. Then, the adder 115 outputs the dither-including pulse radio signal to the E/O 131.

The E/O converter 131 converts the dither-including pulse radio signal which is an electric signal into an optical signal. Then, the E/O converter 131 transmits the optical signal to the O/E converter 133 via the optical fiber cable 132.

The O/E converter 133 converts the optical signal transmitted from the E/O converter 131 into an electric signal. Then, the O/E converter 133 outputs the converted electric signal to the BPF 121 of the remote unit 120.

The BPF 121 extracts a desired frequency component from the electric signal. The BPF 121 then outputs the electric signal to the power amplifier 122.

The power amplifier 122 amplifies the signal extracted by the BPF 121. Then, the power amplifier 122 outputs the amplified signal to the antenna 123.

The antenna 123 emits the output of the power amplifier 122 as a radio wave in the air.

With the above configuration, optical wireless transmission is performed. Next, the operation of the optical wireless transmission system 100 will be described.

First, in the transmission device 110, the DBB 111 generates radio orthogonal signals I(t) and Q(t).

Here, the radio orthogonal signals I(t) and Q(t) are defined by the following equations (1) and (2) by using an amplitude signal A(t) and a phase signal θ(t).

$$I(t) = A(t)\cos\theta(t) \tag{1}$$

$$Q(t) = A(t)\sin\theta(t) \tag{2}$$

Note that the following equations (3) and (4) are also established.

$$A(t) = \sqrt{I(t)^2 + Q(t)^2} \tag{3}$$

$$\theta(t) = \mathrm{Arctan}\big(Q(t)/I(t)\big) \tag{4}$$

Here, it is assumed that A(t) is standardized including I and Q so as to be 1 or less. That is, 0≤A≤1. When a carrier frequency is fc and an angular frequency obtained by multiplying fc by 2π is ωc, a radio signal RF(t) can be defined by the following equation (5).

$$RF(t) = A(t)\ \cos(\omega_C \cdot t - \theta(t)) \tag{5}$$

Here, Rect(a, b) is defined as a function that outputs either value of 1 and −1 according to the values of a and b as in the following equations (6) and (7).

$$Rect(a, b) = 1$$

$$(6)\text{: } -b + 2n\cdot\pi \le a \le b + 2n\cdot\pi \ (n \text{ is any integer})$$

$$Rect(a, b) = -1$$

$$(7)\text{: other than the above}$$

For example, when a=(2π/T)·t, Rect(a, b) is a rectangular wave having a cycle T and a ducy cycle ratio (hereinafter, referred to as DCR) of b/π. In particular, when b=π/2, the DCR is ½, that is, 50%.

Figure 2:
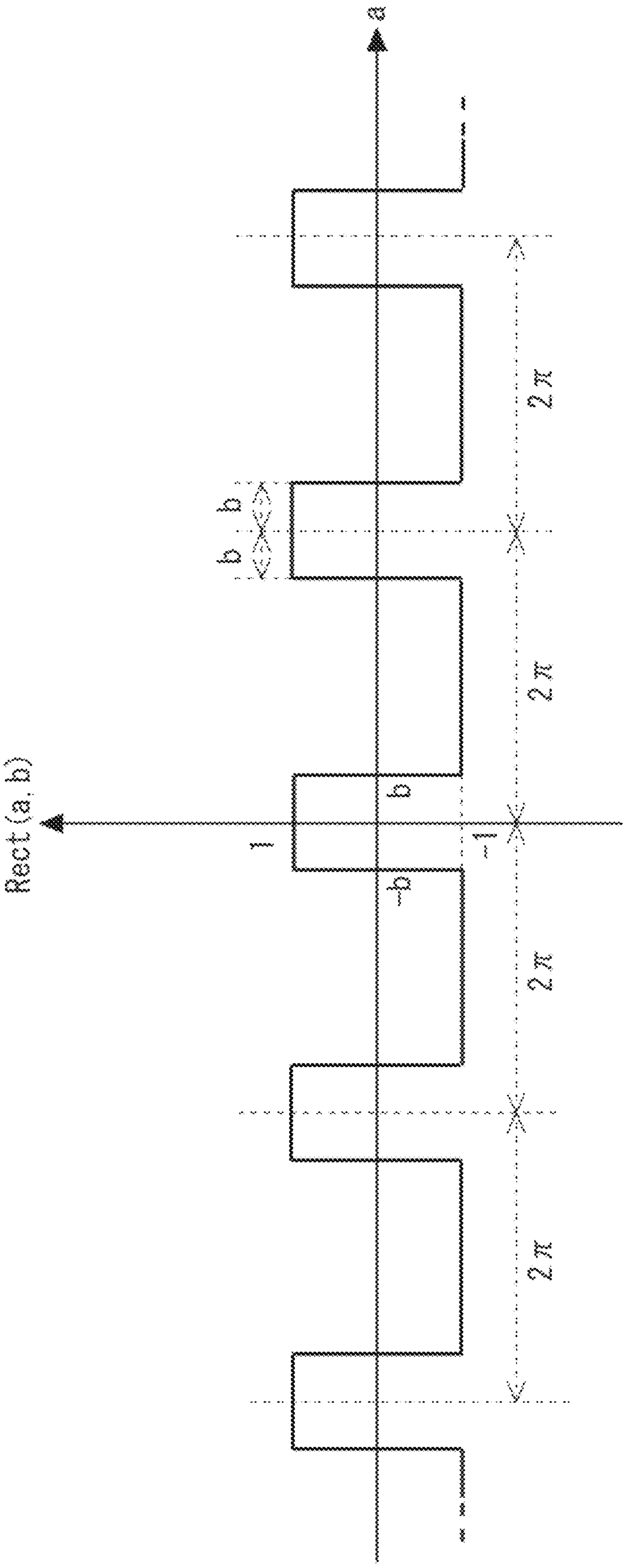
FIG. 2 is a graph illustrating a temporal shift of Rect(a, b).

A time waveform of Rect(a, b) is illustrated in FIG. 2. FIG. 2 is a graph illustrating a temporal shift of Rect(a, b). In FIG. 2, the vertical axis indicates the value of Rect(a, b). The horizontal axis indicates a.

In addition, the pulse modulator 112 inputs I(t) and Q(t) and outputs a pulse signal Spwm(t) defined by following equations (8), (9), and (10).

$$Spwm(t) = Rect(\text{phase}(t), \theta_{edge}(t)) \quad (8)$$

$$\text{phase}(t) = \omega_C \cdot t - \theta(t) \quad (9)$$

$$\theta_{edge}(t) = \arcsin\{A(t)\} \quad (10)$$

When A(t) and θ(t) are substantially constant, it is understood from the equations that the Fourier component of cos $(\omega_c \cdot t - \theta(t))$, which is the fundamental wave of Spwm(t), is proportional to A(t) by taking the product of Spwm(t) and cos $(\omega_c \cdot t - \theta(t))$ and then integrating the product in the range of one cycle (=2π/ωC).

Therefore, Spwm(t) can be defined by RF(t) and a harmonic wave thereof as indicated by the following equation (11).

$$Spwm(t) = k \cdot A(t) \cdot \cos(\omega c \cdot t - \theta(t)) + Hm(t) = k \cdot RF(t) + Hm(t) \quad (11)$$

k is a constant. In addition, Hm(t) is a harmonic component of RF(t).

In addition, DCR is $\theta_{edge}$ (t)/π.

As indicated by the equation (11), by using a filter for removing harmonic components, only a fundamental wave, that is, a desired wave component can be extracted.

Figure 3:
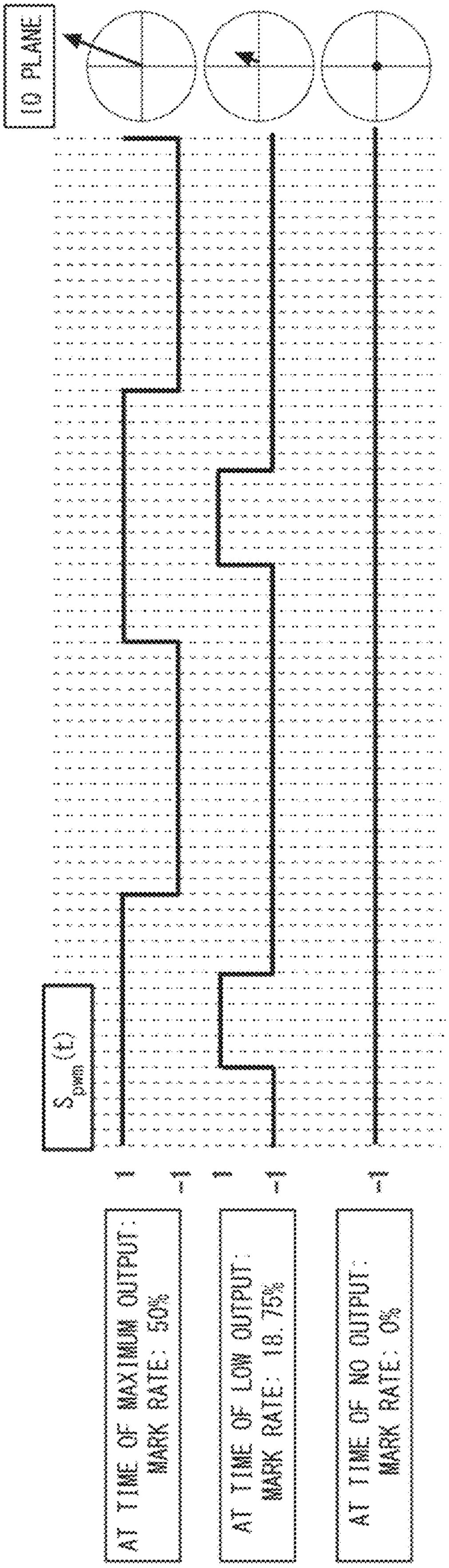
FIG. 3 is a graph illustrating time waveforms and IQ planes of Spwm(t).

FIG. 3 illustrates time waveforms of Spwm(t). FIG. 3 is a graph illustrating time waveforms and IQ planes of Spwm (t). In FIG. 3, the vertical axis indicates Spwm(t). In addition, the horizontal axis indicates time t.

The pulse width in the pulse waveform of Spwm(t) increases at the time of high output when A(t) is large. When A(t)=1, $\theta_{edge}$ (t)=π/2, and the mark rate is 50%, which is the largest.

On the other hand, at the time of low output when A(t) is small, the mark rate decreases. When A(t)=0, $\theta_{edge}$=0, and the mark rate is 0, which is the smallest.

That is, the mark rate of Spwm(t) transitions between 0 and 50%.

Figure 4:
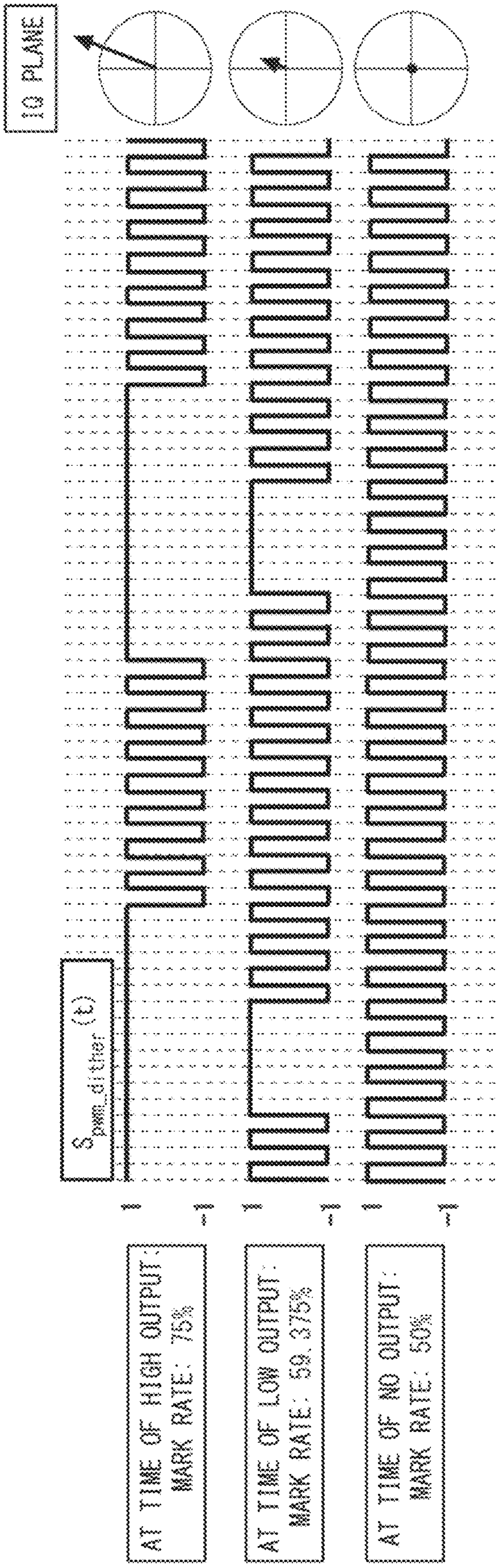
FIG. 4 is a graph illustrating time waveforms and IQ planes of Spwm(t) into which a dither signal is inserted.

An example in which a dither signal is inserted will be described. FIG. 4 is a graph illustrating time waveforms and IQ planes of Spwm(t) into which a dither signal is inserted. In FIG. 4, the vertical axis indicates Spwm(t). In addition, the horizontal axis indicates time t.

The dither modulator 113 generates Spwm_dither by inserting a dither signal generated by the dither signal generator 114 into a Spwm signal.

In Spwm_dither at the time of low output illustrated in FIG. 4, replacement is performed with a dither signal in which high and low alternately change at the time of low output of Spwm. For example, when the mark rate is 50% in Spwm(t), the mark rate is 75% in Spwm_dither. Similarly, when the mark rate is 18.75% in Spwm(t), the mark rate is 59.375% in Spwm_dither. In addition, when the mark rate is 0% in Spwm(t), all the signals become dither signals, and the mark rate is 50% in Spwm_dither.

In addition, in the dither signal, Spwm_dither in FIG. 4 is a pulse signal in which high and low alternately change, but the pulse width of the pulse signal is smaller than the pulse width of Spwm(t). As a result, the band occupied by the dither signal becomes higher than the desired signal band, and interference with the desired signal can be avoided. In addition, as the dither signal, any signal can be used as long as the interference can be avoided. For example, high and low may irregularly change. However, the pulse width of the dither signal at that time needs to be smaller than the pulse width of Spwm(t).

Figure 5:
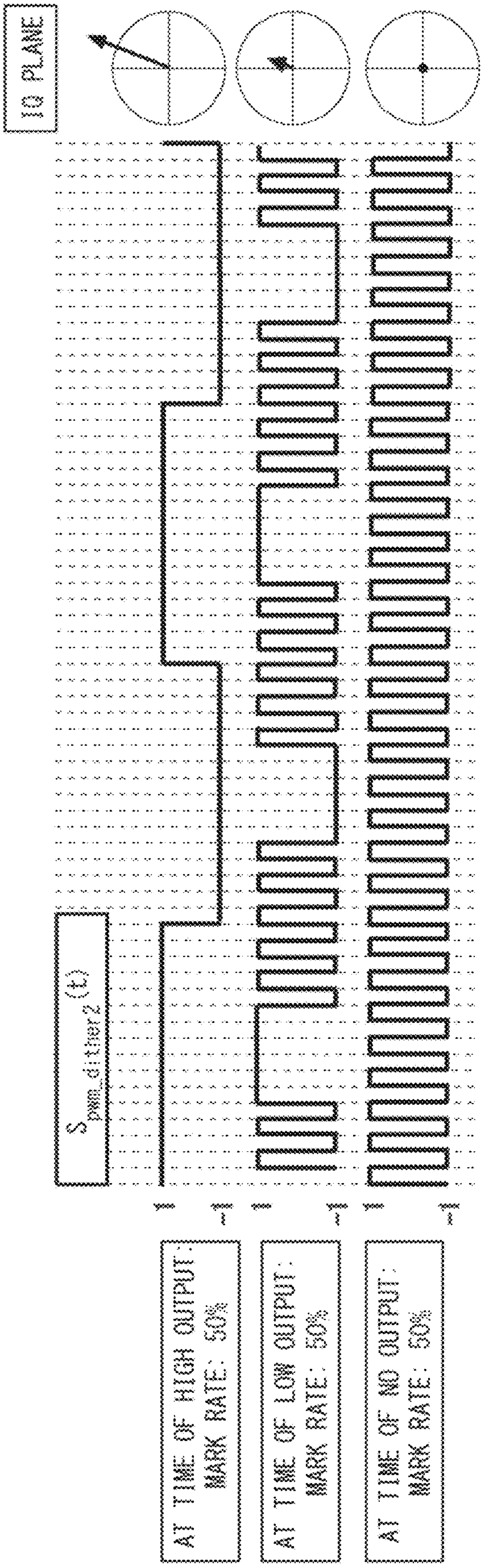
FIG. 5 is a graph illustrating time waveforms and IQ planes of Spwm(t) into which a dither signal is inserted.

As an example in which other dither signals are inserted, Spwm_dither2 is illustrated in FIG. 5. FIG. 5 is a graph illustrating time waveforms and IQ planes of Spwm(t) into which a dither signal is inserted. In FIG. 5, the vertical axis indicates Spwm(t). In addition, the horizontal axis indicates time t. In Spwm_dither2, the waveform at the time of maximum output is the same as Spwm. As the output decreases, the ratio of high in Spwm(t) decreases, but a part of the signal in low is replaced with a dither signal to complement the decrease of high. In Spwm_dither2, at the time of any degree of output, a dither signal is inserted such that the mark rate becomes 50%.

As described above, when the mark rate transitions between 0 and 50% in Spwm(t), the mark rate transitions between 50% and 75% in Spwm_dither, and the mark rate is 50% and constant in Spwm_dither2.

By using this method, an optical module for general-purpose digital communication (stable operation with a mark rate of approximately 20 to 80%) can be used, and the cost of the optical fiber wireless transmission system can be reduced.

As described above, according to the optical wireless transmission system of the first example embodiment, through inserting of a dither signal into a pulse width modulated signal, stable operation is possible even with an optical module for general-purpose digital communication.

Second Example Embodiment

Figure 6:
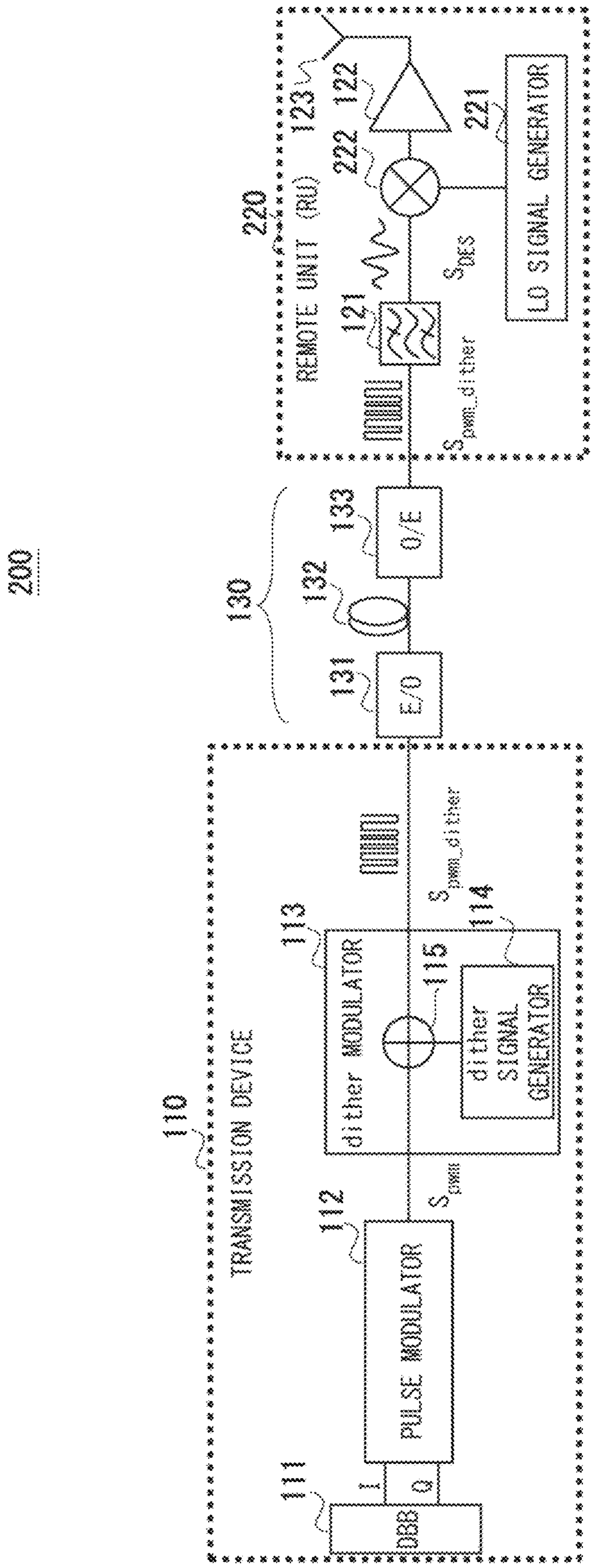
FIG. 6 is a block diagram illustrating an example of an optical wireless transmission system according to a second example embodiment.

In a second example embodiment, an example in which a remote unit outputs an intermediate signal will be described. FIG. 6 is a block diagram illustrating an example of an optical wireless transmission system according to the second example embodiment. In FIG. 6, the same elements as those in FIG. 1 are denoted by the same reference numerals, and the description thereof is omitted. In FIG. 6, an optical wireless transmission system 200 includes the transmission device 110 and a remote unit 220. The remote unit 220 includes the BPF 121, an LO signal generator 221, a mixer 222, the power amplifier 122, and the antenna 123.

The BPF 121 extracts a desired frequency component from the electric signal. The BPF 121 then outputs the electric signal to the mixer 222.

The LO signal generator 221 generates a local oscillation signal having a frequency that is a difference between a desired frequency and the frequency of the signal extracted from the BPF 121. The LO signal generator 221 then outputs the local oscillation signal to the mixer 222.

The mixer 222 mixes the local oscillation signal with the signal extracted from the BPF 121 and outputs a signal having a desired frequency to the power amplifier 122.

The power amplifier 122 amplifies the signal having a desired frequency. Then, the power amplifier 122 outputs the amplified signal to the antenna 123.

As described above, according to the optical wireless transmission system of the second example embodiment, the frequencies can be made different between the signal transmitted through a fiber and the signal emitted from the antenna.

Third Example Embodiment

Figure 7:
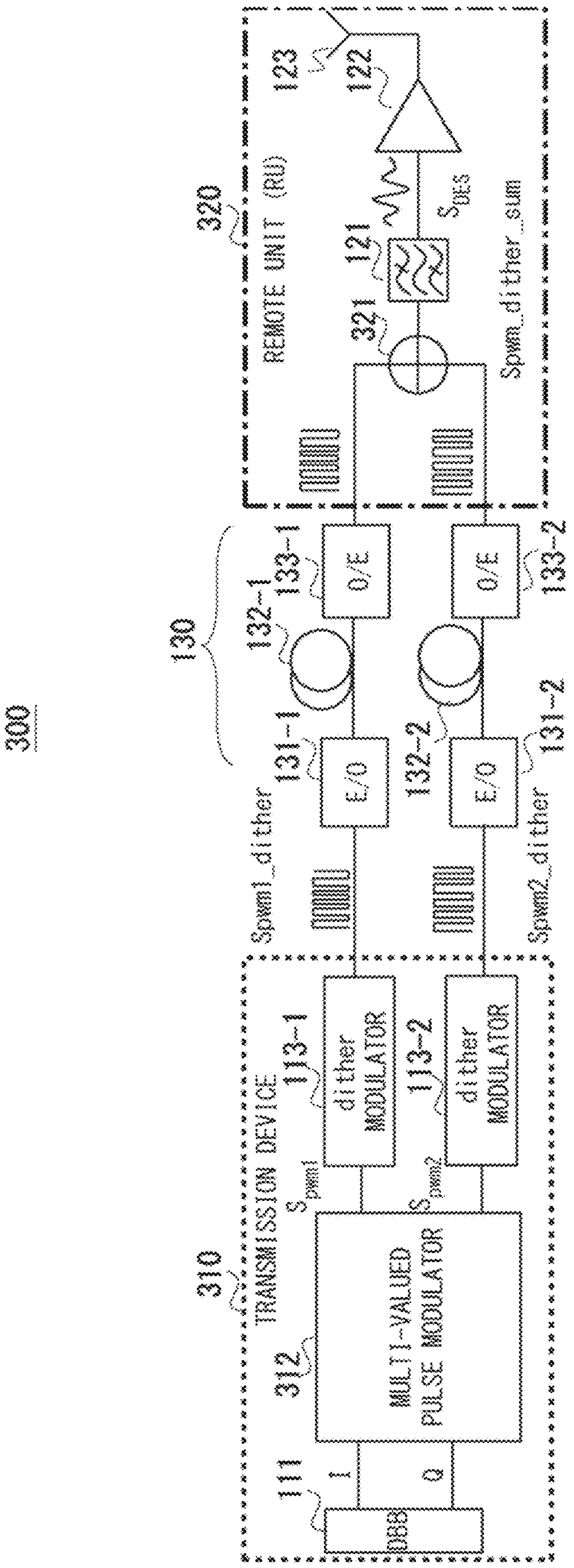
FIG. 7 is a block diagram illustrating an example of an optical wireless transmission system according to a third example embodiment.

In a third example embodiment, an example using multi-valued pulse modulation will be described. FIG. 7 is a block diagram illustrating an example of an optical wireless transmission system according to the third example embodiment. In FIG. 7, the same elements as those in FIG. 1 are denoted by the same reference numerals, and the description thereof is omitted. In FIG. 7, an optical wireless transmission system 300 includes a transmission device 310 and a remote unit 320.

The transmission device 310 includes the DBB 111, a multi-valued pulse modulator 312, and dither modulators 113-1 and 113-2. The remote unit 320 includes the BPF 121, the, an adder 321, the power amplifier 122, and the antenna 123. In addition, the transmission device 310 and the remote unit 320 are connected via E/Os 131-1 and 131-2, optical fiber cables 132-1 and 132-2, and O/Es 133-1 and 133-2. The E/Os 131-1 and 131-2, the optical fiber cables 132-1 and 132-2, and the O/Es 133-1 and 133-2 constitute the optical fiber module 130.

The DBB 111 generates two radio orthogonal signals I and Q. Then, the radio orthogonal signals are output to the multi-valued pulse modulator 312.

The multi-valued pulse modulator 312 performs pulse width modulation on the radio orthogonal signals to generate multi-valued pulse radio signals. Then, the multi-valued pulse modulator 312 outputs the multi-valued pulse radio signals to the dither modulators 113-1 and 113-2. Note that multi-valued pulse modulation is called multi-valued pulse modulation because a sum of bundled signals is multiple values. As an example of the multi-valued pulse modulation, in a case of a ternary value to be described later, processing of a multi-valued pulse radio signal in which two binary pulse-modulated signals (Spwm1($t$) and Spwm2($t$)) outputting 1 or −1 are used, and a sum (Sdes(t)) takes a ternary value of 2, 0, and −2 will be described later.

The dither modulators 113-1 and 113-2 have the same configurations as that of the dither modulator 113 described in the first example embodiment. The dither modulator 113-1 adds a dither signal to the multi-valued pulse radio signal Spwm1 generated by the multi-valued pulse modulator 312. Then, the dither modulator 113-1 outputs a dither-including pulse radio signal to the E/O 131-1.

Similarly, the dither modulator 113-2 adds a dither signal to the multi-valued pulse radio signal Spwm2 generated by the multi-valued pulse modulator 312. Then, the dither modulator 113-2 outputs a dither-including pulse radio signal to the E/O 131-2.

The E/Os 131-1 and 131-2 have the same configurations as that of the E/O 131 described in the first example embodiment. The optical fiber cables 132-1 and 132-2 have the same configurations as that of the optical fiber cable 132 described in the first example embodiment. The O/Es 133-1 and 133-2 have the same configurations as that of the O/E 133 described in the first example embodiment.

The O/E 133-1 and the O/E 133-2 output electric signals obtained by converting optical signals to the adder 321.

The adder 321 adds the electric signals from O/E 133-1 and O/E 133-2. Then, the adder 321 outputs the added electric signals to the BPF 121.

With the above configuration, optical wireless transmission is performed. Next, the operation of the optical wireless transmission system 300 will be described.

Figure 8:
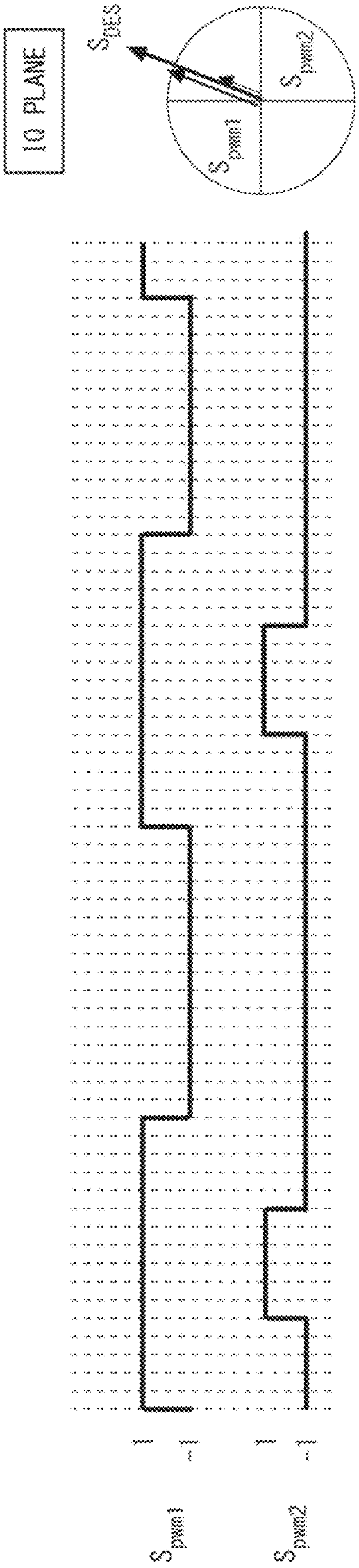
FIG. 8 illustrates multi-valued pulse radio signals and an IQ plane in the third example embodiment.

FIG. 8 illustrates a case where the multi-valued pulse radio signal is ternary. FIG. 8 illustrates multi-valued pulse radio signals and an IQ plane in the third example embodiment. In FIG. 8, the vertical axis indicates Spwm1($t$) and Spwm2($t$). In addition, the horizontal axis indicates time t.

The amplitude signal A(t) is decomposed into two amplitude signals A1($t$) and A2($t$) according to the value as described below.

When 0<=A(t)<=0.5, A1($t$) is defined by the equation (12). In addition, A2($t$) is defined by the equation (13).

$$A1(t) = 2 \cdot A(t) \tag{12}$$

$$A2(t) = 0 \tag{13}$$

When 0.5<A(t)<=1, A1($t$) is defined by the equation (14). In addition, A2($t$) is defined by the equation (15).

$$A1(t) = 1 \tag{14}$$

$$A2(t) = 2 \cdot A(t) - 1 \tag{15}$$

Note that since A(t) takes a value from 0 to 1, A1($t$) and A2($t$) similarly take a value from 0 to 1 as is clear from the above equations (12) to (15).

In addition, the following equation (16) is also established.

$$A(t) = 0.5 \cdot \{A1(t) + A2(t)\} \tag{16}$$

As indicated by the following equations (17) to (22), the multi-valued pulse radio signal generates Spwm1($t$) and Spwm2($t$) as multi-valued pulse radio signals from A1($t$) and A2($t$).

$$Spwm1(t) = Rect(\text{phase}(t), \theta_{edge1}(t)) \tag{17}$$

$$\text{phase}(t) = \omega_C \cdot t - \theta(t) \tag{18}$$

$$\theta_{edge1}(t) = \arcsin\{A1(t)\} \tag{19}$$

$$Spwm2(t) = Rect(\text{phase}(t), \theta_{edge2}(t)) \tag{20}$$

$$\text{phase}(t) = \omega_C \cdot t - \theta(t) \tag{21}$$

$$\theta_{edge2}(t) = \arcsin\{A2(t)\} \tag{22}$$

As illustrated in FIG. 8, in the time waveforms of Spwm1($t$) and Spwm2($t$), each takes a binary value of 1 and −1. In addition, when A(t) and θ(t) are substantially constant, the Fourier components of cos ($\omega_c$·t−θ(t)), which is the fundamental wave of Spwm1($t$) and Spwm2($t$), are proportional to A1($t$) and A2($t$), respectively.

Therefore, Spwm1($t$) and Spwm2($t$) are defined by the following equations (23) and (24).

$$Spwm1(t) = k \cdot A1(t) \cdot \cos(\omega_C \cdot t - \theta(t)) + Hm1(t) \tag{23}$$

$$Spwm2(t) = k \cdot A2(t) \cdot \cos(\omega_C \cdot t - \theta(t)) + Hm2(t) \tag{24}$$

k is a constant, and Hm1($t$) and Hm2($t$) are harmonic components of A1($t$)·cos ($\omega_c$·t−θ(t)) and A2($t$)·cos ($\omega_c$·t−θ(t)), respectively.

When the sum of Spwm1($t$) and Spwm2($t$) is Sdes(t), the following equation (25) is obtained.

$$Sdes(t) = 2k \cdot RF(t) + Hm1(t) + Hm2(t) \quad (25)$$

Therefore, Sdes(t) includes RF(t) that is a desired signal. As indicated by the equation (25), by using a filter for removing harmonic components, only desired wave components can be extracted.

In addition, since Spwm1($t$) and Spwm2($t$) are binary values of 1 or −1, Sdes(t) which is the sum of Spwm1($t$) and Spwm2($t$) takes a ternary value of 2, 0, and −2. Therefore, Sdes(t) is a ternary pulse signal.

In addition, DCRs of Spwm1($t$) and Spwm2($t$) are $\theta_{edge1}(t)/\pi$ and $\theta_{edge2}(t)/\pi$, respectively.

The pulse width in the pulse waveform of Spwm1($t$) increases at the time of high output when A1($t$) is large, and when A1($t$)=1, $\theta_{edge1}(t)=\pi/2$, and the mark rate is 50%, which is the largest.

On the other hand, at the time of low output when A1($t$) is small, the mark rate decreases, and when A1($t$)=0, $\theta_{edge1}=0$, and the mark rate is 0, which is the smallest.

That is, the mark rate of Spwm1($t$) transitions between 0 and 50%.

Similarly, the mark rate of Spwm2($t$) similarly transitions between 0 and 50%.

The two dither modulators 113-1 and 113-2 illustrated in FIG. 7 respectively generate Spwm1_dither and Spwm2_dither in which dither signals generated by a dither signal generator are inserted into Spwm1 and Spwm2.

As described in the description of Spwm_dither in FIG. 2, by using a dither modulator, the mark rates of Spwm1_dither and Spwm2_dither transitions between 50% and 75% by the similar operation. In addition, when the dither modulator described in the description of Spwm_dither2 of FIG. 2 is used, the mark rate is 50% and is constant.

As described above, according to the optical wireless transmission system of the third example embodiment, the optical module for general-purpose digital communication (stable operation with a mark rate of approximately 20 to 80%) can be used, and the cost of the optical fiber wireless transmission system can be reduced. In addition, according to the optical wireless transmission system of the third example embodiment, it is possible to reduce quantization noise of a desired signal and transmit a signal having a high SN ratio through making of the pulse signal multi-valued.

Note that the description has been given assuming that a plurality of fibers for transmitting a plurality of dither-including pulse-modulated signals is prepared for each signal, but one fiber may be used using wavelength multiplexing.

Fourth Example Embodiment

Figure 9:
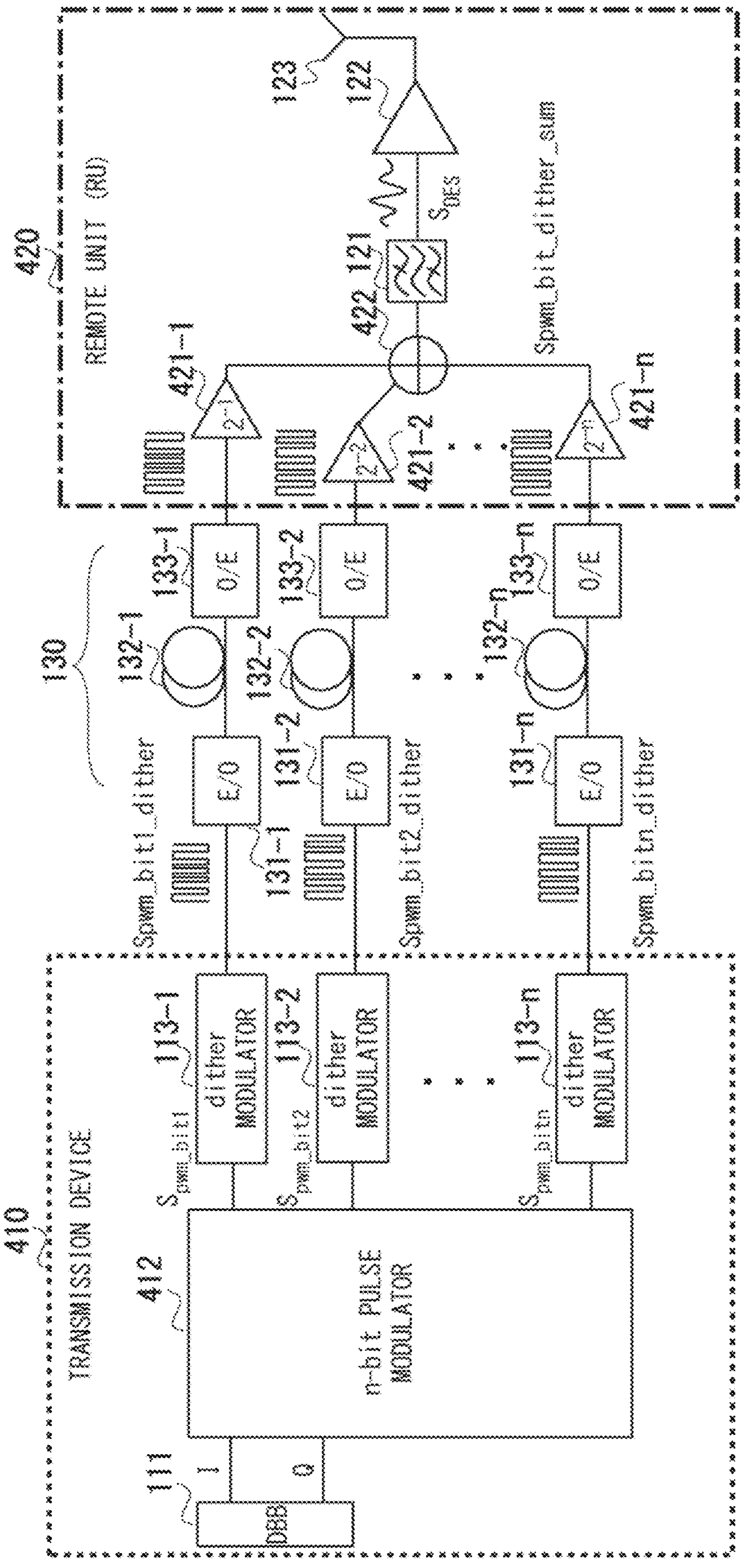
FIG. 9 is a block diagram illustrating an example of an optical wireless transmission system according to a fourth example embodiment.

In a fourth example embodiment, an example in which A(t) of the third example embodiment is decomposed into n-bit signals and modulated will be described. FIG. 9 is a block diagram illustrating an example of an optical wireless transmission system according to the fourth example embodiment. In FIG. 9, the same elements as those in FIG. 1 are denoted by the same reference numerals, and the description thereof is omitted. In FIG. 9, an optical wireless transmission system 400 includes a transmission device 410 and a remote unit 420.

The transmission device 410 includes the DBB 111, an n-bit pulse modulator 412, and dither modulators 113-1 to 113-$n$. The remote unit 420 includes amplifiers 421-1 to 421-$n$, an adder 422, the BPF 121, the power amplifier 122, and the antenna 123. In addition, the transmission device 410 and the remote unit 420 are connected via E/Os 131-1 to 131-$n$, optical fiber cables 132-1 to 132-$n$, and O/Es 133-1 to 133-$n$. The E/Os 131-1 and 131-2, the optical fiber cables 132-1 and 132-2, and the O/Es 133-1 and 133-2 constitute the optical fiber module 130.

The DBB 111 generates two radio orthogonal signals I and Q. Then, the radio orthogonal signals are output to the n-bit pulse modulator 412.

The n-bit pulse modulator 412 performs pulse width modulation on the radio orthogonal signals to generate n-bit pulse radio signals. Then, the n-bit pulse modulator 412 outputs the n-bit pulse radio signals to the dither modulators 113-1 to 113-$n$. Note that n-bit pulse modulation is pulse modulation expressed using n bits. Examples of the n-bit pulse radio signals are Spwm_bit1($t$), Spwm_bit2($t$), . . . , and Spwm_bitn(t) described later.

The dither modulators 113-1 to 113-$n$ have the same configurations as that of the dither modulator 113 described in the first example embodiment. The dither modulator 113-1 adds a dither signal to a multi-valued pulse radio signal Spwm_bit generated by the multi-valued pulse modulator 312. Then, the dither modulator 113-1 outputs a dither-including pulse radio signal Spwm_bit1_dither to the E/O 131-1.

Similarly, the dither modulator 113-$n$ adds a dither signal to an n-bit pulse radio signal Spwm_bitn generated by the multi-valued pulse modulator 312. Then, the dither modulator 113-$n$ outputs a dither-including pulse radio signal Spwm_bitn_dither to the E/O 131-$n$.

The E/Os 131-1 to 131-$n$ have the same configurations as that of the E/O 131 described in the first example embodiment. The optical fiber cables 132-1 to 132-$n$ have the same configuration as that of the optical fiber cable 132 described in the first example embodiment. The O/E 133-1 to 133-$n$ have the same configurations as that of the O/E 133 described in the first example embodiment.

The O/E 133-1 outputs an electric signal obtained by converting an optical signal to the amplifier 421-1. Similarly, the O/E 133-$n$ outputs an electric signal obtained by converting an optical signal to the amplifier 421-$n$.

The amplifiers 421-1 to 421—each amplify an electric signal at a magnification corresponding to the position of the respective bit signals, and output the amplified electric signal to the adder 422. For example, when the electric signal amplified by the amplifier 421-1 corresponds to a most significant bit (MSB), and the electric signal amplified by the amplifier 421-N corresponds to a least significant bit (LSB), the ratio of the amplification factor of the amplifier 421-1: the amplification factor of the amplifier 421-2: the amplification factor of the amplifier 421-$n$ is $2^{-1}:2^{-2}:2^{-n}$.

The adder 422 adds the electric signals from the amplifiers 421-1 to 421-$n$. Then, the adder 422 outputs the added electric signals to the BPF 121.

With the above configuration, optical wireless transmission is performed. Next, the operation of the optical wireless transmission system 400 will be described.

When the number of bits is n, A(t) is decomposed as in the following equation (26). Note that A_bit1($t$) is MSB, and A_bitn(t) is LSB.

$$A(t) = 2^{-1}\text{A\_bit1}(t) + 2^{-2}\cdot\text{A\_bit2}(t) + 2^{-3}\cdot\text{A\_bit3}(t) + \ldots + 2^{n}\cdot\text{A\_bitn}(t) \quad (26)$$

Here, signals obtained by pulse-modulating each of A_bit1(*t*), A_bit2(*t*), . . . , and A_bitn(t) are referred to as Spwm_bit1(*t*), Spwm_bit2(*t*), . . . , and Spwm_bitn(t). These signals are pulse signals that take binary values of 1 and −1.

The pulse signals Spwm_bit1_dither and Spwm_bitn_dither obtained by adding dither signals from Spwm_bit1(*t*) to Spwm_bitn(t) are transmitted through a fiber, transmitted by a remote unit, and combined by being multiplied by a predetermined coefficient, whereby a desired signal can be generated.

As described above, according to the optical wireless transmission system of the fourth example embodiment, quantization noise can be further reduced, and a higher SN ratio can be realized.

Fifth Example Embodiment

Figure 10:
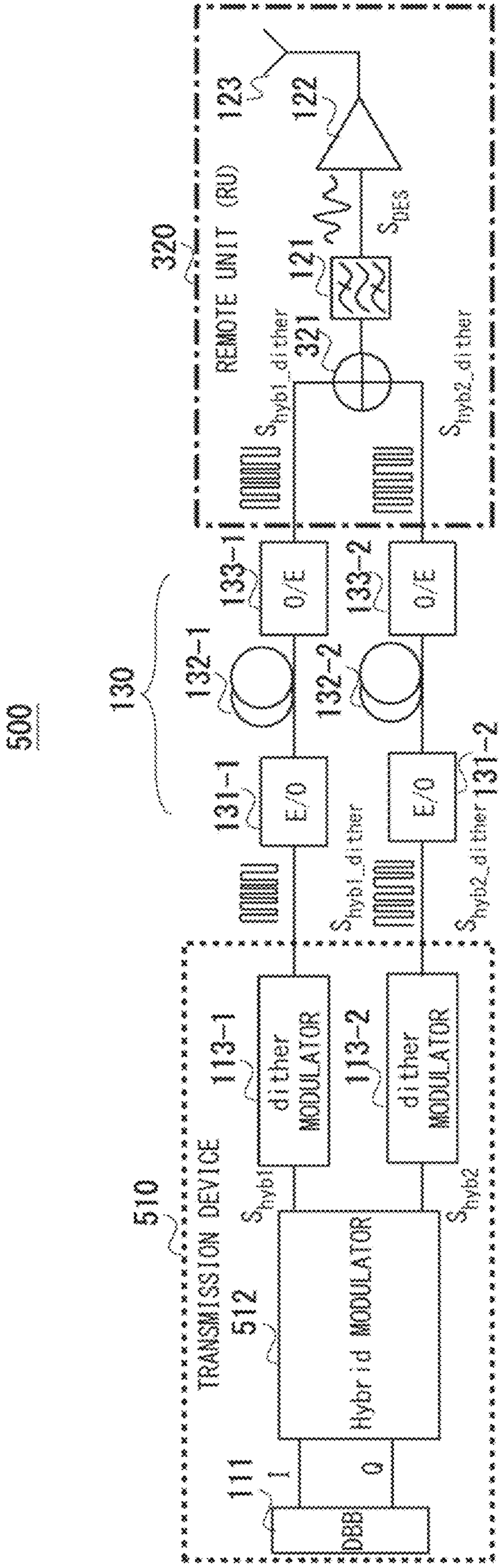
FIG. 10 is a block diagram illustrating an example of an optical wireless transmission system according to a fifth example embodiment.

In a fifth example embodiment, an example in which the multi-valued pulse modulator of the second example embodiment is replaced with a hybrid modulator will be described. FIG. 10 is a block diagram illustrating an example of an optical wireless transmission system according to the fifth example embodiment. In FIG. 10, the same elements as those in FIG. 1 or FIG. 7 are denoted by the same reference numerals, and the description thereof is omitted. In FIG. 10, an optical wireless transmission system 500 includes a transmission device 510 and the remote unit 320. The transmission device 510 includes the DBB 111, a hybrid modulator 512, and the dither modulators 113-1 and 113-2.

The DBB 111 generates two radio orthogonal signals I and Q. Then, the radio orthogonal signals are output to the hybrid modulator 512.

The hybrid modulator 512 expresses the input signals by an outphasing system when the input signals are larger than a predetermined value, and pulse-modulates the input signals when the input signals are equal to or less than the predetermined value. Then, the processed signals are output to the dither modulators 113-1 and 113-2.

The dither modulators 113-1 and 113-2 have the same configurations as that of the dither modulator 113 described in the first example embodiment. The dither modulator 113-1 adds a dither signal to a multi-valued pulse radio signal Shyb1 processed by the hybrid modulator 512. Then, the dither modulator 113-1 outputs a dither-including pulse radio signal to the E/O 131-1.

Similarly, the dither modulator 113-2 adds a dither signal to a multi-valued pulse radio signal Shyb2 processed by the hybrid modulator 512. Then, the dither modulator 113-2 outputs a dither-including pulse radio signal to the E/O 131-2.

With the above configuration, optical wireless transmission is performed. Next, the operation of the optical wireless transmission system 500 will be described.

The hybrid modulator 512 is a system in which the outphasing system and the pulse modulation system are switched depending on the magnitude of the amplitude signal A(t). Hereinafter, the magnitude of the amplitude at the switching point is referred to as Amid.

When Amid<A(t)<=1, the outphasing system is applied.

When 0<=A(t)<=Amid, the pulse modulator is applied.

Note that an outphasing signal expresses a radio signal whose amplitude fluctuates by a sum of a pair of vector signals having a constant amplitude. Vector signals OP1 and OP2 are defined by the following equations (27) and (28).

$$OP1(t) = \cos(\omega_C \cdot t - \theta(t) - \theta amp(t)) \quad (27)$$

$$OP2(t) = \cos(\omega_C \cdot t - \theta(t) + \theta amp(t)) \quad (28)$$

However, $$\theta amp(t) = \text{Arccos}(A(t))$$

$$\omega_C = 2\pi \cdot f_C$$

Note that, considering that the desired signal RF(t) is A(t) cos ($\omega_c \cdot t - \theta(t)$), the following equation (29) is established.

$$OP1(t) + OP2(t) = 2 \cdot RF(t) \quad (29)$$

Therefore, the sum of OP1(*t*) and OP2(*t*) includes RF(t).

Figure 11:
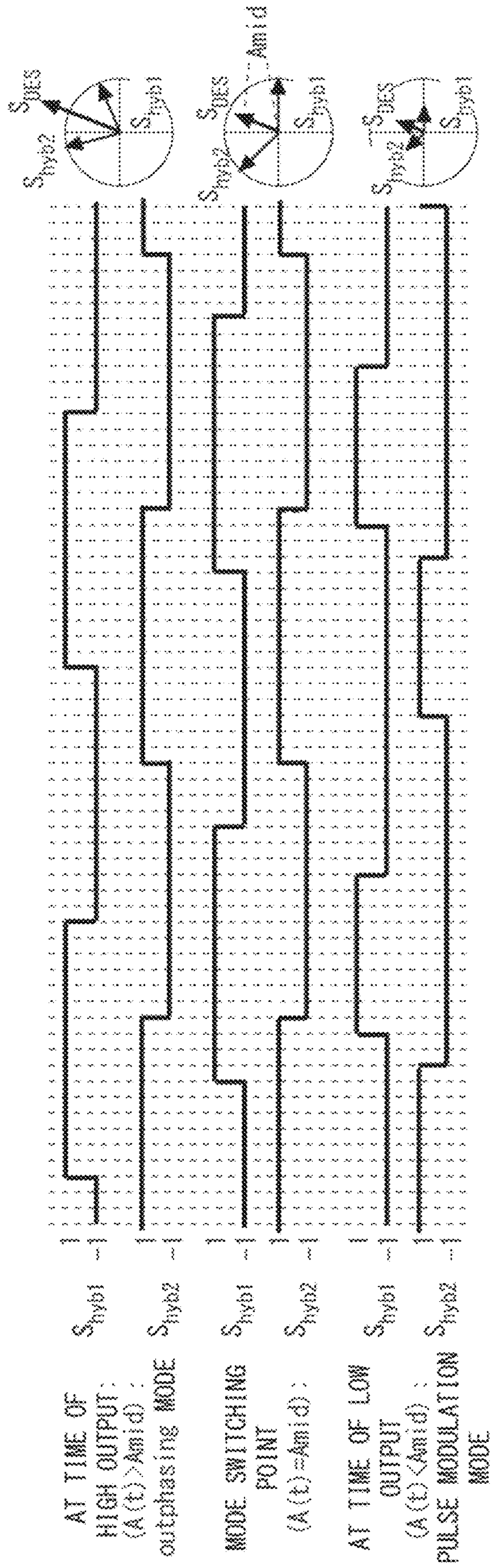
FIG. 11 is a graph illustrating an example of time waveforms and IQ planes of hybrid modulation in the optical wireless transmission system of the fifth example embodiment.

Next, time waveforms of the hybrid modulator 512 will be described. FIG. 11 is a graph illustrating an example of time waveforms and IQ planes of hybrid modulation in the optical wireless transmission system of the fifth example embodiment. In FIG. 11, two signals output from the hybrid modulator 512 are Shyb1(*t*) and Shyb2(*t*).

When Amid<A(t)<=1, Shyb1 and Shyb2 are signals obtained by converting outphasing signals into a rectangular shape.

$$Shyb1(t) = k \cdot OP1(t) + Hmh1(t) \quad (30)$$

$$Shyb2(t) = k \cdot OP2(t) + Hmh2(t) \quad (31)$$

In the above equations (30) and (31), Hmh1(*t*) and Hmh2(*t*) are harmonic signals generated when the outphasing signals are converted into rectangular shape. k is a constant.

The sum of Shyb1(*t*) and Shyb2(*t*) includes the desired signal RF(t) as indicated by the following equation (32).

$$Shyb1(t) + Shyb2(t) = 2k \cdot RF(t) + Hmh1(t) + Hmh2(t) \quad (32)$$

When A(t)=Amid, Camp(t)=Arccos (Amid), and thus, the following equations (33) and (34) are obtained.

$$Shyb1(t) = k \cdot \cos(\omega_C \cdot t - \theta(t) - \arccos(Amid)) + Hmh1(t) \quad (33)$$

$$Shyb2(t) = k \cdot \cos(\omega_C \cdot t - \theta(t) + \arccos(Amid)) + Hmh2(t) \quad (34)$$

The sum of Shyb1(*t*) and Shyb2(*t*) includes the desired signal RF(t) as in the case of Amid<A(t)<=1.

When 0<=A(t)<Amid, pulse modulation is performed, and the following equations (35) to (39) are obtained.

$$Shyb1(t) = Rect(\text{phase\_h1}(t), \theta_{edge\_h}(t)) \quad (35)$$

-continued $$Shyb2(t) = Rect(\text{phase\_h2}(t), \theta_{edge\_h}(t)) \tag{36}$$

$$\text{phase\_h1}(t) = \omega_C \cdot t - \theta(t) - \arccos(Amid) \tag{37}$$

$$\text{phase\_h2}(t) = \omega_C \cdot t - \theta(t) + \arccos(Amid) \tag{38}$$

$$\theta_{edge\_h}(t) = \arcsin\{A(t)/Amid\} \tag{39}$$

Similarly to the third example embodiment, in Shyb1(*t*) and Syb2(*t*), the fundamental waves are expressed by cos ($\omega_c$·t−θ(t)—arccos (Amid)) and cos (ωc·t−θ(t)+arccos (Amid)), respectively, and the Fourier components of the fundamental waves include A(t)/Amid as indicated by the following equations (40) and (41).

$$Shyb1(t) = k \cdot \{A(t)/Amid\} \cdot \cos(\omega c \cdot t - \theta(t) - \arccos(Amid)) + Hmh1(t) \tag{40}$$

$$Shyb2(t) = k \cdot \{A(t)/Amid\} \cdot \cos(\omega c \cdot t - \theta(t) + \arccos(Amid)) + Hmh2(t) \tag{41}$$

In the equations, the sum of Shyb1(*t*) and Shyb2(*t*) includes the desired signal RF(t) as indicated by the following equation (42), similarly to the case of A(t)>=Amid.

$$Shyb1(t) + Shyb2(t) = 2k \cdot RF(t) + Hmh1(t) + Hmh2(t) \tag{42}$$

The time waveforms of the pulse are illustrated in FIG. 11. When A(t) is equal to or larger than Amid, the mark rate is 50%, but when A(t) is smaller than Amid, the mark rate deviates from 50% (in FIG. 11, the mark rate decreases. An inverted signal may be considered, in which case, the mark rate increases). Therefore, when A(t) is smaller than Amid, it is possible to avoid an extremely large or small mark rate through adding of a dither signal. Therefore, a commercially available optical module for digital communication can be used.

As described above, according to the optical wireless transmission system of the fifth example embodiment, when A(t) is equal to or larger than Amid, it is not necessary to add a dither signal. Therefore, the strength of the dither signal in the signal combined by the remote unit is reduced, and the blocking characteristics of the filter that removes unnecessary wave components of the dither signal can be eased. As a result, cost reduction can be achieved.

Note that the present disclosure is not limited to the above example embodiments and can be appropriately changed without departing from the gist. For example, the first to the fifth example embodiments may be appropriately combined.

Further, in the above example embodiments, the pulse modulator and the dither modulator are cascade-connected to the transmission device 110, but any configuration that generates the signal waveform illustrated in FIG. 2 can be applied. Therefore, the present disclosure may include any configuration capable of generating the signal waveform of FIG. 2. For example, a processor that directly derives and outputs Spwm_dither by calculation using IQ as input signals may be included.

Elements that are shown in the drawings as functional blocks for performing various kinds of processing may be configured by a CPU, a memory, or another circuit as hardware or may be implemented by a program loaded to a memory or the like as software. It would be thus obvious to those skilled in the art that those functional blocks may be implemented in various forms such as hardware only, software only or a combination of those, and not limited to any of them.

Further, the above-described program can be stored and provided to a computer using any type of non-transitory computer readable media. Non-transitory computer readable media include various types of tangible storage media. Examples of non-transitory computer-readable medium include a magnetic recording medium (for example, a flexible disk, a magnetic tape, or a hard disk drive), a magneto-optical recording medium (for example, a magneto-optical disc), a CD-read only memory (ROM) CD-R, a CD-R/W, and a semiconductor memory (for example, a mask ROM, a programmable ROM (PROM), an erasable PROM (EPROM), a flash ROM, and a random access memory (RAM)). In addition, the program may also be provided to a computer using various types of transitory computer readable media. Examples of transitory computer readable media include electric signals, optical signals, and electromagnetic waves. Transitory computer readable media can provide the program to a computer via a wired communication line such as electric wires and optical fibers or a wireless communication line.

REFERENCE SIGNS LIST

100, 200, 300, 400, 500 OPTICAL WIRELESS TRANSMISSION SYSTEM
110, 310, 410, 510 TRANSMISSION DEVICE
111 DBB
112 PULSE MODULATOR
113, 113-1 to **113-*n*** dither MODULATOR
114 dither SIGNAL GENERATOR
115, 321, 422 ADDER
120, 220, 320, 420 REMOTE UNIT
121 BPF
122 POWER AMPLIFIER
123 ANTENNA
130 OPTICAL FIBER MODULE
131, 131-1 to **131-*n*** E/O CONVERTER
132, 132-1 to **132-*n*** OPTICAL FIBER CABLE
133, 133-1 to **133-*n*** O/E CONVERTER
221 LO SIGNAL GENERATOR
222 MIXER
312 MULTI-VALUED PULSE MODULATOR
412 PULSE MODULATOR
421 AMPLIFIER
512 HYBRID MODULATOR

What is claimed is:

1. An optical wireless transmission system comprising:

a transmission device including a digital baseband processor configured to generate a plurality of orthogonal signals, a pulse modulator configured to pulse-modulate an orthogonal signal, and a dither modulator configured to add a dither signal to a pulse-modulated signal;

an optical fiber module configured to convert a signal to which a dither signal is added into an optical signal, transmit the optical signal through an optical fiber, and convert the optical signal into a digital electric signal; and a remote unit configured to transmit a digital electric signal transmitted by the optical fiber module as a radio signal.

2. The optical wireless transmission system according to claim 1, wherein the dither modulator includes a dither signal generator configured to generate a dither signal, and an adder configured to add a dither signal to a pulse-modulated signal.

3. The optical wireless transmission system according to claim 1, wherein the dither modulator generates a signal by bundling a plurality of binary pulse-modulated signals with respect to input of a ternary or more value.

4. The optical wireless transmission system according to claim 1, wherein the dither modulator is a hybrid modulator configured to express an input signal by an outphasing system when the input signal is larger than a predetermined value, and pulse-modulate the input signal when the input signal is equal to or less than the predetermined value.

5. The optical wireless transmission system according to claim 1, wherein the remote unit includes an LO signal generator configured to generate a local oscillation signal, and a mixer configured to mix the local oscillation signal with the digital electric signal.

6. A transmission device comprising:

a digital baseband processor configured to generate a plurality of orthogonal signals;

a pulse modulator configured to pulse-modulate an orthogonal signal; and a dither modulator configured to add a dither signal to a pulse-modulated signal.

7. An optical wireless transmission method comprising:

in a transmission device, generating a plurality of orthogonal signals, pulse-modulating an orthogonal signal, and adding a dither signal to a pulse-modulated signal;

in an optical fiber module, converting a signal to which a dither signal is added into an optical signal, transmitting the optical signal through an optical fiber, and converting the optical signal into a digital electric signal; and in a remote unit, transmitting a digital electric signal transmitted by the optical fiber module as a radio signal.

* * * * *